(12) United States Patent
Yang et al.

(10) Patent No.: US 11,283,622 B2
(45) Date of Patent: *Mar. 22, 2022

(54) SIGNATURE VERIFICATION FOR A BLOCKCHAIN LEDGER

(71) Applicant: Advanced New Technologies Co., Ltd, Grand Cayman (KY)

(72) Inventors: Xinying Yang, Hangzhou (CN); Benquan Yu, Hangzhou (CN); Yuan Zhang, Hangzhou (CN); Yize Li, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

This patent is subject to a terminal disclaimer.

(21) Appl. No.: 17/366,869

(22) Filed: Jul. 2, 2021

(65) Prior Publication Data
US 2021/0336798 A1    Oct. 28, 2021

Related U.S. Application Data

(63) Continuation of application No. 16/945,677, filed on Jul. 31, 2020, now Pat. No. 11,057,220, which is a
(Continued)

(30) Foreign Application Priority Data

Apr. 18, 2019    (CN) .......................... 201910314541.4

(51) Int. Cl.
*H04L 9/32*    (2006.01)
*H04L 9/06*    (2006.01)

(52) U.S. Cl.
CPC .......... *H04L 9/3247* (2013.01); *H04L 9/0637* (2013.01); *H04L 9/0643* (2013.01); *H04L 2209/38* (2013.01)

(58) Field of Classification Search
CPC . H04L 2209/38; H04L 9/0637; H04L 9/0643; H04L 9/3247
See application file for complete search history.

(56) References Cited

U.S. PATENT DOCUMENTS 9,122,729 B2    9/2015    Love et al.
9,489,498 B2    11/2016   Cha et al.
(Continued)

FOREIGN PATENT DOCUMENTS

CN    101247232    8/2008
CN    104125239    10/2014
(Continued)

OTHER PUBLICATIONS

Search Query Report from IP.com (performed Nov. 3, 2021) (Year: 2021).*

(Continued)

*Primary Examiner* — Sharon S Lynch
(74) *Attorney, Agent, or Firm* — Fish & Richardson P.C.

(57) ABSTRACT

Implementations of this specification provide signature verification methods and apparatuses for a blockchain ledger. An example method includes receiving by a server, a signature verification instruction that comprises a verification object parameter and a hash value. The verification object parameter includes a third-party parameter, a platform parameter, or a time service certificate parameter, the verification object parameter indicates a type of a to-be-verified object, and the server is configured to store data by using the blockchain ledger. The server obtains the to-be-verified object based on the verification object parameter and the hash value. The type of the to-be-verified object includes a third-party digital signature, a server digital signature, or a time service certificate. The server sends the to-be-verified object to a client for verification by the client.

17 Claims, 7 Drawing Sheets

Related U.S. Application Data continuation of application No. 16/777,735, filed on Jan. 30, 2020, now Pat. No. 11,070,379, which is a continuation of application No. PCT/CN2020/072000, filed on Jan. 14, 2020.

(56) References Cited

U.S. PATENT DOCUMENTS

| | | | |
|---|---|---|---|
| 10,230,526 B2* | 3/2019 | Manning | H04L 9/3236 |
| 10,320,569 B1* | 6/2019 | Wentz | H04L 9/0866 |
| 10,340,038 B2* | 7/2019 | Witchey | G06F 21/00 |
| 10,425,230 B1* | 9/2019 | Tang | H04L 9/0894 |
| 10,530,577 B1* | 1/2020 | Pazhoor | H04L 9/0866 |
| 10,616,324 B1* | 4/2020 | Kaddoura | H04L 69/329 |
| 11,055,277 B2* | 7/2021 | Yang | H04L 9/3265 |
| 2002/0056042 A1 | 5/2002 | van der Kaay et al. | |
| 2014/0032913 A1* | 1/2014 | Tenenboym | H04L 9/3247 713/176 |
| 2016/0191243 A1* | 6/2016 | Manning | H04L 9/321 713/168 |
| 2017/0033932 A1* | 2/2017 | Truu | H04L 9/3239 |
| 2017/0046698 A1* | 2/2017 | Haldenby | G06Q 20/3829 |
| 2017/0078101 A1* | 3/2017 | Maximov | H04L 9/3242 |
| 2017/0206523 A1* | 7/2017 | Goeringer | G06Q 20/409 |
| 2017/0213209 A1 | 7/2017 | Billenberger | |
| 2017/0249482 A1* | 8/2017 | Takaai | H04L 9/3263 |
| 2017/0257358 A1* | 9/2017 | Ebrahimi | H04L 9/3297 |
| 2017/0337534 A1* | 11/2017 | Goeringer | G06Q 20/123 |
| 2017/0346637 A1* | 11/2017 | Zhang | H04L 9/3247 |
| 2018/0025166 A1* | 1/2018 | Daniel | G06F 9/5011 713/189 |
| 2018/0089683 A1* | 3/2018 | Setty | G06Q 20/065 |
| 2018/0109516 A1* | 4/2018 | Song | H04L 9/3268 |
| 2018/0152442 A1* | 5/2018 | Buldas | G06F 21/64 |
| 2018/0176228 A1* | 6/2018 | He | H04L 9/3236 |
| 2018/0198626 A1* | 7/2018 | Kroonmaa | H04L 9/0637 |
| 2018/0367316 A1* | 12/2018 | Cheng | H04L 9/3247 |
| 2019/0034465 A1* | 1/2019 | Shimamura | H04L 9/3239 |
| 2019/0068562 A1* | 2/2019 | Iyer | H04L 9/3213 |
| 2019/0079950 A1* | 3/2019 | Ramabaja | H04L 9/3239 |
| 2019/0081793 A1* | 3/2019 | Martino | G06Q 20/065 |
| 2019/0109709 A1* | 4/2019 | Wu | H04L 9/3236 |
| 2019/0149537 A1* | 5/2019 | Ebrahimi | H04L 63/0442 713/171 |
| 2019/0158481 A1* | 5/2019 | Ronda | H04L 63/08 |
| 2019/0171849 A1* | 6/2019 | Assenmacher | G06F 21/64 |
| 2019/0182047 A1* | 6/2019 | Andreina | G06F 21/6281 |
| 2019/0208414 A1* | 7/2019 | Roennow | H04W 12/086 |
| 2019/0229930 A1* | 7/2019 | Haque | H04L 67/12 |
| 2019/0236594 A1* | 8/2019 | Ehrlich-Quinn | G06Q 20/065 |
| 2019/0253256 A1* | 8/2019 | Saab | H04L 9/0637 |
| 2019/0260737 A1* | 8/2019 | Brown | G06Q 20/40145 |
| 2019/0273617 A1* | 9/2019 | Maher | H04L 9/0844 |
| 2019/0312734 A1* | 10/2019 | Wentz | H04L 9/3247 |
| 2019/0334728 A1* | 10/2019 | Zhang | H04L 9/3236 |
| 2019/0340170 A1* | 11/2019 | Pierce | G06Q 20/02 |
| 2019/0349426 A1* | 11/2019 | Smith | H04W 4/70 |
| 2019/0358515 A1* | 11/2019 | Tran | A42B 3/0433 |
| 2019/0363829 A1* | 11/2019 | Tune | H03K 19/0033 |
| 2019/0372781 A1* | 12/2019 | Ra | H04L 9/3213 |
| 2019/0394047 A1* | 12/2019 | Karame | H04L 9/3247 |
| 2020/0012527 A1* | 1/2020 | Hartsock | H04L 9/0894 |
| 2020/0013025 A1* | 1/2020 | Verma | H04L 9/3297 |
| 2020/0019616 A1* | 1/2020 | Sukhija | H04L 9/3239 |
| 2020/0052886 A1* | 2/2020 | Buldas | H04L 9/3247 |
| 2020/0067705 A1* | 2/2020 | Brown | H04L 9/3231 |
| 2020/0076571 A1* | 3/2020 | Natarajan | G06F 16/2246 |
| 2020/0092102 A1* | 3/2020 | Wang | H04W 12/06 |
| 2020/0112427 A1* | 4/2020 | Nakamura | H04L 9/3239 |
| 2020/0112440 A1* | 4/2020 | Nakamura | H04L 9/0891 |
| 2020/0112442 A1* | 4/2020 | Wentz | H04L 9/3247 |
| 2020/0117690 A1* | 4/2020 | Tran | G06F 16/90332 |
| 2020/0136831 A1* | 4/2020 | Danielson | H04L 9/3247 |
| 2020/0145219 A1* | 5/2020 | Sebastian | H04L 9/3231 |
| 2020/0159697 A1* | 5/2020 | Wood | H04L 9/3297 |
| 2020/0192957 A1* | 6/2020 | Augustine | G06F 16/9536 |
| 2020/0195423 A1* | 6/2020 | Yang | H04L 9/3297 |
| 2020/0210407 A1* | 7/2020 | Yang | H04L 9/3265 |
| 2020/0213089 A1* | 7/2020 | Yang | H04L 9/0637 |
| 2020/0213094 A1* | 7/2020 | Yang | H04L 9/3297 |
| 2020/0213117 A1* | 7/2020 | Resch | H04L 9/0643 |
| 2020/0213136 A1* | 7/2020 | Yang | H04L 9/3263 |
| 2020/0244470 A1* | 7/2020 | Ruckriemen | H04L 63/12 |
| 2020/0244652 A1* | 7/2020 | Iyer | H04L 9/3247 |
| 2020/0250590 A1* | 8/2020 | Augustine | G06F 16/9024 |
| 2020/0259653 A1* | 8/2020 | Endress | H04L 9/3239 |
| 2020/0259843 A1* | 8/2020 | Setty | H04L 9/3239 |
| 2020/0280442 A1* | 9/2020 | Serres | H04L 9/3249 |
| 2020/0280444 A1* | 9/2020 | Tang | G06F 21/31 |
| 2020/0364705 A1* | 11/2020 | Yadav | H04L 9/088 |

FOREIGN PATENT DOCUMENTS

| | | |
|---|---|---|
| CN | 104753881 | 7/2015 |
| CN | 106952082 | 7/2017 |
| CN | 107103459 | 8/2017 |
| CN | 107395358 | 11/2017 |
| CN | 107579817 | 1/2018 |
| CN | 107707025 | 2/2018 |
| CN | 108512652 | 9/2018 |
| CN | 108830545 | 11/2018 |
| CN | 109118223 | 1/2019 |
| CN | 109583887 | 4/2019 |
| CN | 110163006 | 8/2019 |

OTHER PUBLICATIONS

Crosby et al., "BlockChain Technology: Beyond Bitcoin," Sutardja Center for Entrepreneurship & Technology Technical Report, Oct. 16, 2015, 35 pages.

Nakamoto, "Bitcoin: A Peer-to-Peer Electronic Cash System," www.bitcoin.org, 2005, 9 pages.

PCT International Search Report and Written Opinion in International Application No. PCT/CN2020/072000, dated Apr. 15, 2020, 17 pages (with machine translation).

Search Query Report from IP.com performed on Mar. 25, 2021, 5 pages.

Search Query Report from IP.com, performed Dec. 10, 2020, 5 pages.

Search Query Report from IP.com, performed on Jan. 12, 2021, 4 pages.

Search Query Report from IP.com, performed on Jul. 6, 2020, 4 pages.

Search Query Report from IP.com, performed on Nov. 6, 2020, 5 pages.

Search Query Report from IP.com, performed on Sep. 29, 2020, 5 pages.

PCT International Preliminary Report on Patentability in International Application No. PCT/CN2020/072000, dated Sep. 28, 2021, 10 pages (with English translation).

* cited by examiner

SIGNATURE VERIFICATION FOR A BLOCKCHAIN LEDGER

CROSS-REFERENCE TO RELATED APPLICATIONS

This application is a continuation of U.S. application Ser. No. 16/945,677, filed on Jul. 31, 2020, which is a continuation of U.S. application Ser. No. 16/777,735, filed on Jan. 30, 2020, which is a continuation of PCT Application No. PCT/CN2020/072000, filed on Jan. 14, 2020, which claims priority to Chinese Patent Application No. 201910314541.4, filed on Apr. 18, 2019, and each application is hereby incorporated by reference in its entirety.

TECHNICAL FIELD

Implementations of the present specification relate to the field of information technologies, and in particular, to a signature verification method, system, apparatus, and device in a blockchain ledger.

BACKGROUND

When a centralized database server provides services externally by using a blockchain ledger, usually there can be multiple users in one ledger. To ensure authenticity of data in the ledger, a digital signature is usually needed for data exchange in the ledger. In addition, the database server further generates another related signature certificate for the ledger, for example, a time service certificate for a part of ledger. Thus, multiple digital signatures can be involved in one ledger.

There are multiple signatures in a blockchain ledger. A user needs to know at any time that digital signatures of other parties related to the user are truthful and trustworthy. However, in practice, the user does not know which stakeholders are involved in the user's data in the ledger or how to verify digital signatures of other stakeholders.

SUMMARY

An objective of implementations of the present application is to provide a digital signature verification method in a blockchain ledger.

To alleviate the previous technical problem, the implementations of the present application are implemented as follows:

A signature verification method in a blockchain ledger is applied to a system including a database server and a client, where the database server stores data by using the blockchain ledger in a centralized way, and the method includes: sending, by the client, a signature verification instruction that includes a verification object parameter and a hash value to the database server, where the verification object parameter includes a third-party parameter, a platform parameter, and a time service certificate parameter, and where the verification object parameter is used to indicate a type of a to-be-verified object; obtaining, by the server, the to-be-verified object based on the verification object parameter and the hash value, where the type of the to-be-verified object includes a third-party digital signature, a server digital signature, or a time service certificate; sending, by the server, the to-be-verified object to the client; and verifying, by the client, the to-be-verified object to generate a verification result.

Correspondingly, an implementation of the present specification further provides a signature verification system in a blockchain ledger. The system includes a database server and a client. The database server stores data by using the blockchain ledger in a centralized way.

The client sends a signature verification instruction that includes a verification object parameter and a hash value to the database server, where the verification object parameter includes a third-party parameter, a platform parameter, and a time service certificate parameter, and where the verification object parameter is used to indicate a type of a to-be-verified object; the server obtains the to-be-verified object based on the verification object parameter and the hash value, where the type of the to-be-verified object includes a third-party digital signature, a server digital signature, or a time service certificate; the server sends the to-be-verified object to the client; and the client verifies the to-be-verified object to generate a verification result.

Correspondingly, an implementation of the present specification further provides a signature verification method in a blockchain ledger, applied to a database server that stores data by using the blockchain ledger in a centralized way, and the method includes: receiving a signature verification instruction that includes a verification object parameter and a hash value, where the verification object parameter includes a third-party parameter, a platform parameter, and a time service certificate parameter, and where the verification object parameter is used to indicate a type of a to-be-verified object; obtaining the to-be-verified object based on the verification object parameter and the hash value, where the type of the to-be-verified object includes a third-party digital signature, a server digital signature, or a time service certificate; and sending the to-be-verified object to a client, so the client performs verification.

Correspondingly, an implementation of the present specification further provides a signature verification apparatus in a blockchain ledger, applied to a database server that stores data by using the blockchain ledger in a centralized way, and the apparatus includes: a receiving module, configured to receive a signature verification instruction that includes a verification object parameter and a hash value, where the verification object parameter includes a third-party parameter, a platform parameter, and a time service certificate parameter, and where the verification object parameter is used to indicate a type of a to-be-verified object; a determining module, configured to obtain the to-be-verified object based on the verification object parameter and the hash value, where the type of the to-be-verified object includes a third-party digital signature, a server digital signature, or a time service certificate; and a sending module, configured to send the to-be-verified object to a client, so the client performs verification.

It can be seen from the previous technical solutions provided in the implementations of the present application that, a user specifies, by using a verification object parameter when initiating verification, a type that needs to be verified and provides a related hash value, so a server can determine, based on the hash value and the verification object parameter, a digital signature that the user wants to verify, to obtain a digital signature of data related to the hash value for the user to perform verification. The implementations enable the user to flexibly verify various digital signatures involved in the same ledger.

In addition, any one of the implementations in the present specification does not need to achieve all the previous effects.

BRIEF DESCRIPTION OF DRAWINGS

To describe the technical solutions in the implementations of the present specification or in the existing technology more clearly, the following briefly describes the accompanying drawings needed for describing the implementations or the existing technology. Apparently, the accompanying drawings in the following description merely show some implementations of the present specification, and a person of ordinary skill in the art can still derive other drawings from these accompanying drawings.

DESCRIPTION OF IMPLEMENTATIONS

Figure 1:
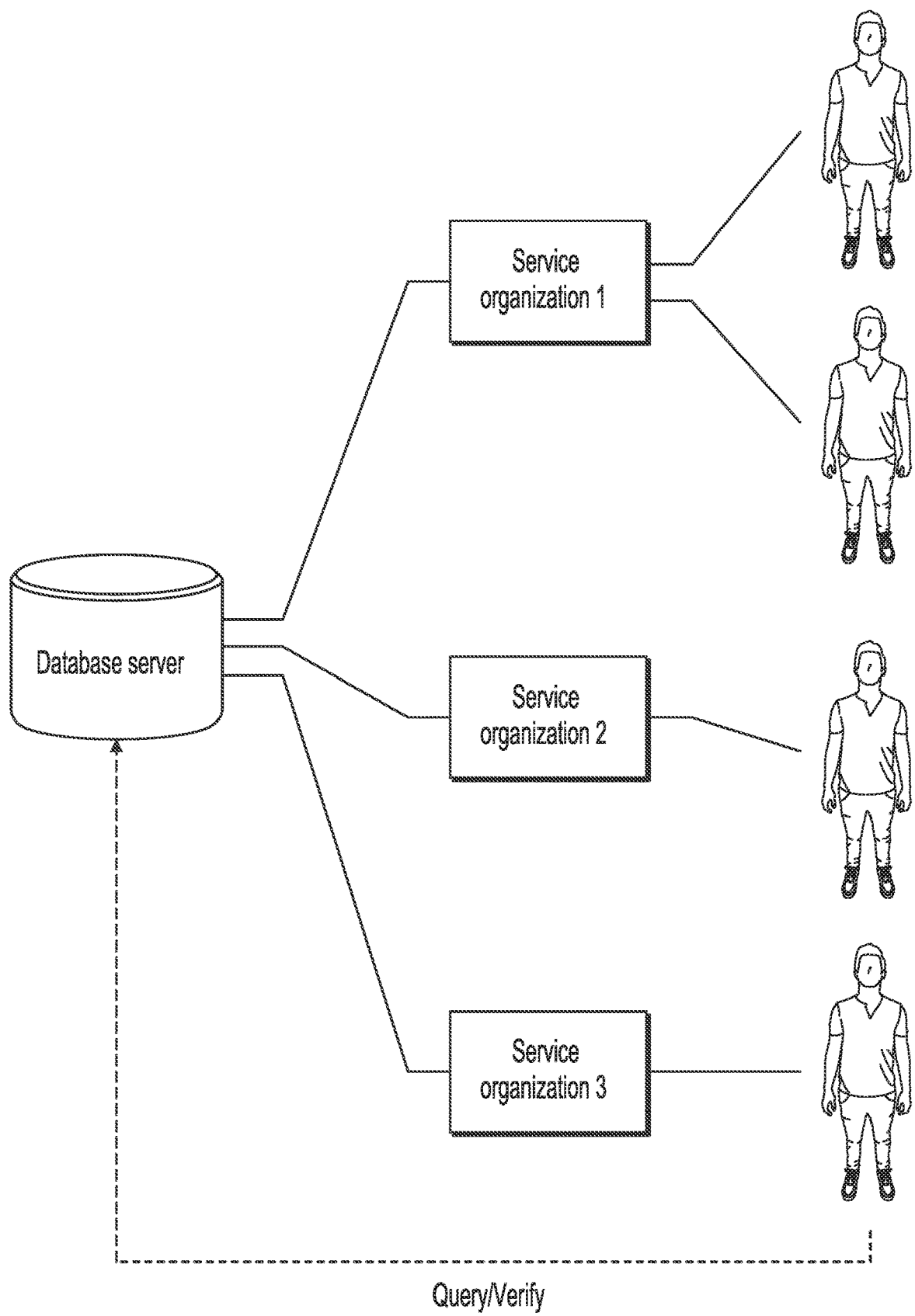
FIG. 1 is a schematic architectural diagram illustrating a system, according to an implementation of the present specification.

To make a person skilled in the art better understand the technical solutions in the implementations of the present specification, the following describes in detail the technical solutions in the implementations of the present specification with reference to the accompanying drawings in the implementations of the present specification. Apparently, the described implementations are merely some but not all of the implementations of the present specification. All other implementations obtained by a person of ordinary skill in the art based on the implementations of the present specification shall fall within the protection scope of the present specification.

First, a centralized blockchain ledger in the present specification is described.

In a centralized database service provider involved in the implementations of the present specification, one ledger includes multiple data blocks, and the data blocks are pre-generated by: receiving to-be-stored data records, and determining a hash value of each data record, where the to-be-stored data records here can be various expense records of an individual user of a client, or can be a service result, an intermediate state, an operation record, etc. that are generated when an application server executes service logic based on an instruction of the user; can include an expense record, an audit log, a supply chain, a government supervision record, a medical record, etc. in specific service scenarios; and when a predetermined blocking condition is satisfied, determining each data record to be written into a data block to generate an Nth data block that includes a hash value of the data block and the data record.

The predetermined blocking condition includes: The number of to-be-stored data records reaches a quantity threshold. For example, each time one thousand data records are received, one new data block is generated, and the one thousand data records are written into the block. Or a time interval counting from a previous blocking moment reaches a time threshold. For example, one new data block is generated every five minutes, and a data record received within the five minutes is written into the block.

N refers to a serial number of a data block. In other words, in this implementation of the present specification, data blocks are arranged in a form of block-chain and in a sequence of blocking moments, and have a strong time sequence characteristic. Block heights of the data blocks are monotonically increased based on a sequence of blocking moments. The block height can be a serial number, and in this case, the block height of the Nth data block is N. The block height can also be generated in another method.

When N=1, the data block is an initial data block. A hash value and a block height of the initial data block are determined based on a predetermined method. For example, the initial data block does not include a data record, a hash value is any given hash value, and a block height blknum=0. For another example, a trigger condition for generating the initial data block is consistent with a trigger condition for another data block, but the hash value of the initial data block is determined by hashing all content in the initial data block.

When N>1, because content and a hash value of a previous data block are determined, a hash value of a current data block (the Nth data block) can be generated based on the hash value of the previous data block (that is, the (N−1)th data block). For example, in a feasible method, hash values of all data records to be written into the Nth block are determined, and a Merkle tree is generated based on an arrangement sequence of the data records in the block. A root hash value of the Merkle tree is combined with the hash value of the previous data block to generate the hash value of the current data block by using a hash algorithm. For another example, a hash value of the entire data record can be obtained by performing combination and hashing based on the sequence of data records in the block. The hash value of the entire data record is combined with the hash value of the previous data block to obtain a character string. A hash operation is performed on the character string to generate the hash value of the data block.

When a server generates one data block and writes the data block into the ledger, a hash value of the data block and a hash value of each data record in the data block can be returned to a client.

In the previous data block generation method, each data block is determined by using a hash value, and the hash value of the data block is determined by content and a sequence of data records in the data block, and a hash value of a previous data block. The user can initiate verification at any time based on the hash value of the data block. Modification to any content in the data block (including the content or the sequence of data records in the data block) causes a difference between a hash value of the data block calculated during verification and a hash value of the data block during generation, which causes a verification failure. Thus, the method can achieve immutability under centralization.

Specifically, a data record is verified by obtaining the data record and determining a hash value of the data record and a hash value of another data record in a data block in which the data record is located, to form a Merkle tree and verify whether a root hash of the Merkle tree can be regenerated. A data block is verified by recalculating a hash value of the data block based on a hash value of a previous data block and a data record of the data block, and verifying whether the hash value is consistent with a previously calculated hash value.

In this service method, one ledger can be interconnected with multiple organization users (the users here are usually enterprise users). For example, one ledger is interconnected with multiple hospitals and health insurance institutions. These hospitals and health insurance institutions write relevant medical records into the ledger when providing services to individual users. In this process, before the hospitals and the health insurance institutions write the medical record into the ledger, a digital signature is usually included. The database server can write the medical record into the ledger after signature verification succeeds.

Or one ledger can be interconnected with multiple service cooperation organization users, and the organizations do not provide services externally but separately write their respective service data records into the same ledger. Before a service data record of any organization is written into the ledger, multiple users involved in the service data need to confirm the service data record. FIG. 1 is a schematic architectural diagram illustrating a system, according to an implementation of the present specification. It is worthwhile to note that in this architecture, an individual user can initiate a verification request to a server through a service organization, or can directly initiate a verification request to the server.

Individual users/organization users know that their data records are written into a ledger. In addition, when a data record is written into the ledger, the user further obtains a hash value related to the data record (a hash value generated by the data record or a hash value of a data block in which the data record is located), and can directly initiate query and verification to the server based on the hash value.

Figure 2:
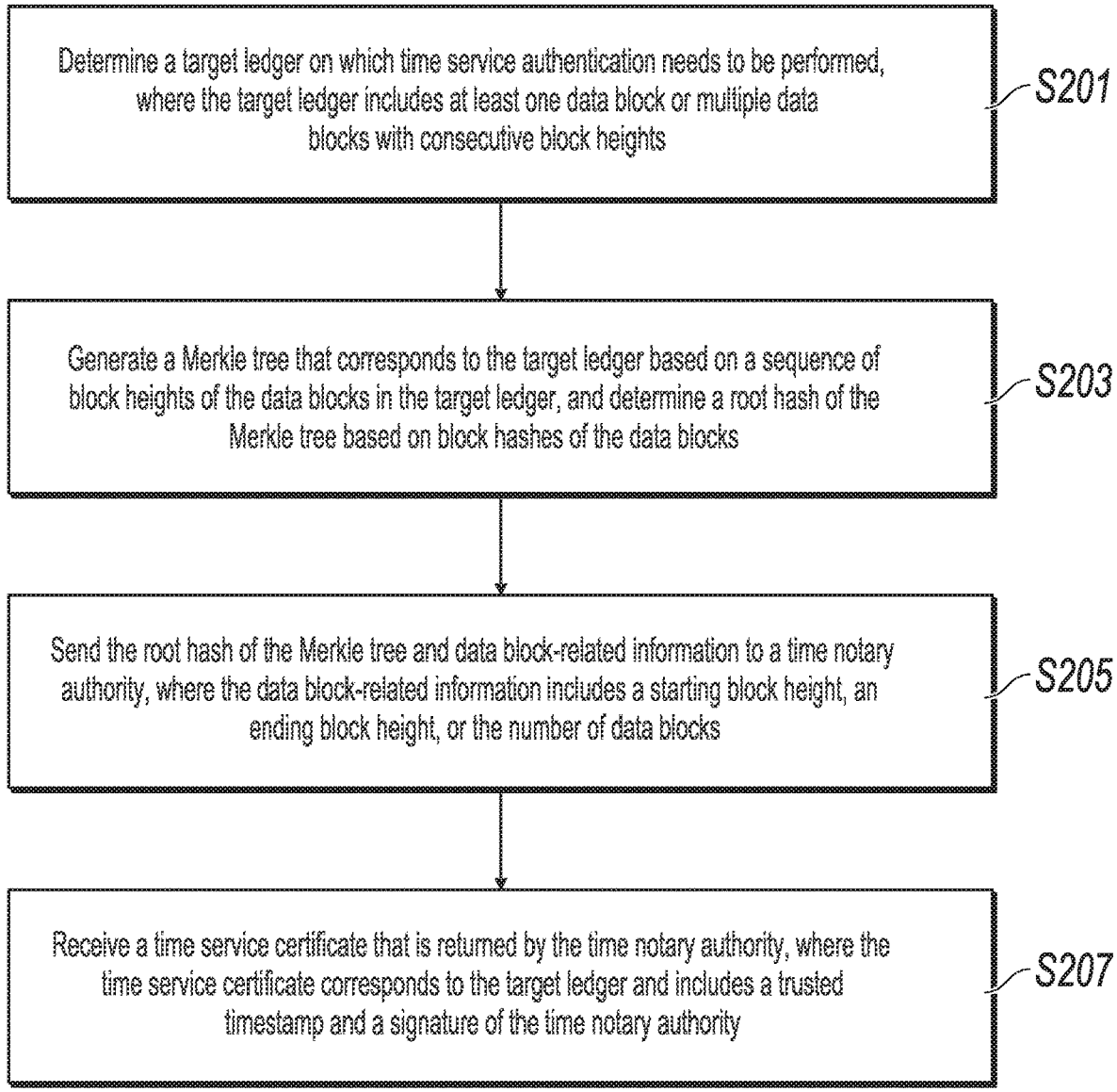
FIG. 2 is a schematic flowchart illustrating a time service authentication method for a blockchain ledger, according to an implementation of the present specification.

In addition, in the ledger provided in this implementation of the present specification, to prevent a pseudo blockchain, a time service authentication method for the ledger is further provided. FIG. 2 is a schematic flowchart illustrating a time service authentication method for a blockchain ledger, according to an implementation of the present specification. The process specifically includes the following steps:

S201. Determine a target ledger on which time service authentication needs to be performed, where the target ledger includes at least one data block or multiple data blocks with consecutive block heights.

First, it is worthwhile to note that, as described above, in the blockchain ledger, except an initial data block, each data block includes at least one data record, each data block includes a hash value of the data block determined based on a hash value of a previous data block and the data record included in the data block, and block heights of data blocks are increased monotonically based on a sequence of blocking moments.

Specifically, a serving party first determines, from a data block that has been generated and stored, a part of ledger on which time service authentication needs to be performed, where the part of ledger needs to include at least one data block or multiple data blocks with consecutive block heights. A determining method can be specified based on a user operation. For example, a user initiates a time service instruction, and the instruction includes a starting block height and the number of blocks for time service authentication. Or the determining method does not need to be specified by the user, and the serving party automatically determines the part of ledger based on predetermined service logic.

For example, time service authentication can be performed on each data block, that is, the finest granularity. As such, a root hash of a Merkel tree is a hash value of the data block, and therefore the maximum degree of authenticity protection can be performed on the ledger (that is, each data block). Because there is relatively high blocking frequency of data blocks, costs are relatively high for both a time service center and a serving party. In an optional method, a certain predetermined time service condition is set, and when the predetermined time service condition is satisfied, a time service request is initiated. When newly generated data blocks are considered as data blocks on which time service authentication is to be performed, the predetermined time service condition can be as follows: The number of data blocks on which time service authentication is to be performed reaches a quantity threshold, or a time interval counting from previous time service authentication has reached a time threshold.

S203. Generate a Merkle tree that corresponds to the target ledger based on a sequence of block heights of the data blocks in the target ledger, and determine a root hash of the Merkle tree based on block hashes of the data blocks.

Due to the dependence relationship across the blockchain ledger, the Merkle tree here only needs to be generated based on the sequence of data blocks. A specific root hash calculation method is a conventional calculation method, and details are omitted here.

S205. Send the root hash of the Merkle tree and data block-related information to a trusted time service authority, where the data block-related information includes a starting block height, an ending block height, or the number of data blocks.

Once receiving the previous information, the trusted time service authority (for example, a national time service center or a time service authority authorized by the national time service center) gives a trusted timestamp and performs digital signature verification on the trusted timestamp to generate a time service certificate that includes a trusted timestamp and a digital signature. The time service certificate can further include related information of the data block, and a method of the digital signature is conventional private key encryption and public key decryption.

S207. Receive a time service certificate that is returned by the trusted time service authority, where the time service certificate corresponds to the target ledger and includes a trusted timestamp and a signature of the trusted time service authority.

Therefore, the serving party can receive a series of trusted timestamps that include the signature of the trusted time service authority, each trusted timestamp corresponds to a part of ledger, and based on related information, a corresponding data block can be clearly determined. The serving party can perform corresponding management and verification based on the trusted timestamp.

Figure 3:
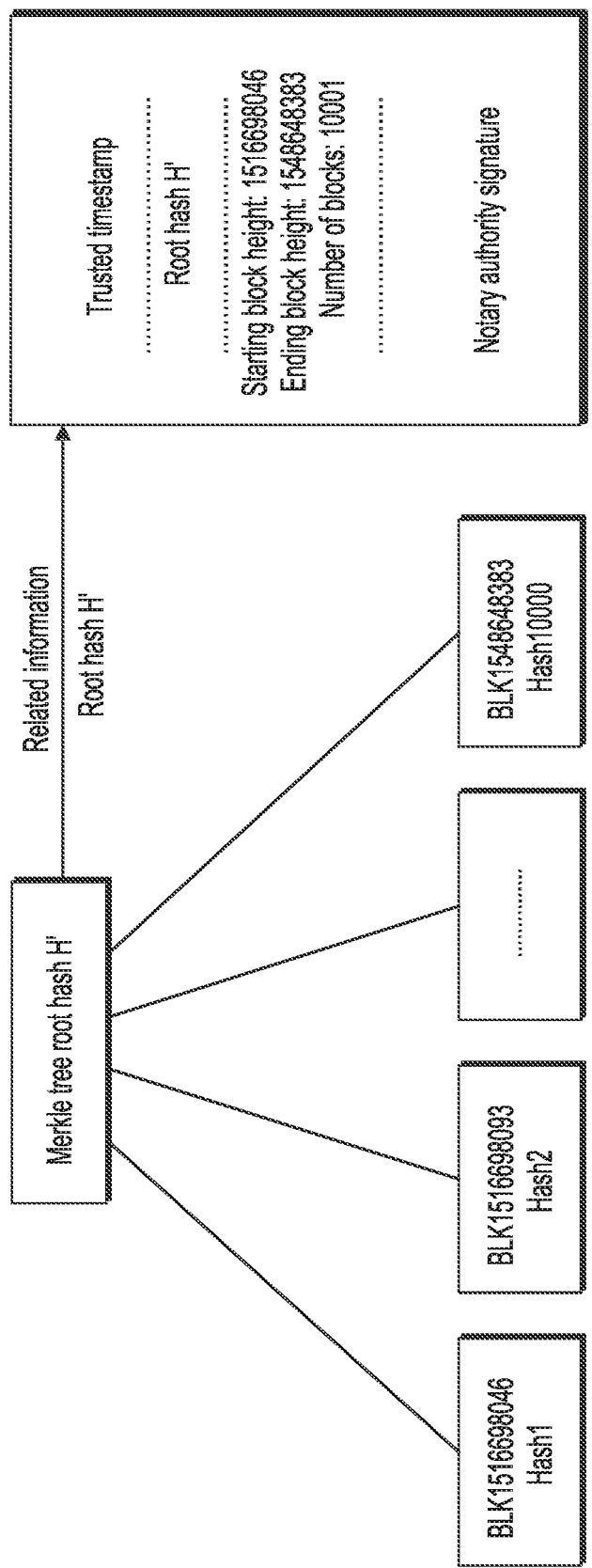
FIG. 3 is a specific schematic diagram of generating a time service certificate, according to an implementation of the present specification.

For example, when a certain ledger needs to be audited, the serving party can give a time service certificate that is of a corresponding data block in the ledger and that includes a trusted timestamp and a signature of the trusted time service authority, and recalculate a root hash of a Merkle tree based on the related information included in the time service certificate. If the calculated root hash of the Merkle tree is consistent with that in the certificate, it can be verified that the certificate is correct. In addition, it can be further determined from the trusted timestamp that the data block corresponding to the certificate cannot be forged in future, thereby effectively preventing a serving party and a served party from jointly producing a ledger that includes a false timestamp to elude a corresponding audit. FIG. 3 is a specific schematic diagram of generating a time service certificate, according to an implementation of the present specification. In this schematic diagram, the Merkle tree is not specifically shown. The time service certificate can be used to confirm and verify that the part of ledger cannot be forged in future, and can effectively prevent the serving party and the served party from jointly producing a ledger including a false timestamp.

In the previous process, it can be seen that a certain individual user/organization user can have multiple data records scattered in a ledger. Each data record can involve different organization parties. When the user needs to verify authenticity of the ledger, the user still worries about reliability of a signature of an organization related to the user's data and reliability of a digital signature of a server, and authenticity of a time service certificate provided by the server.

Figure 4:
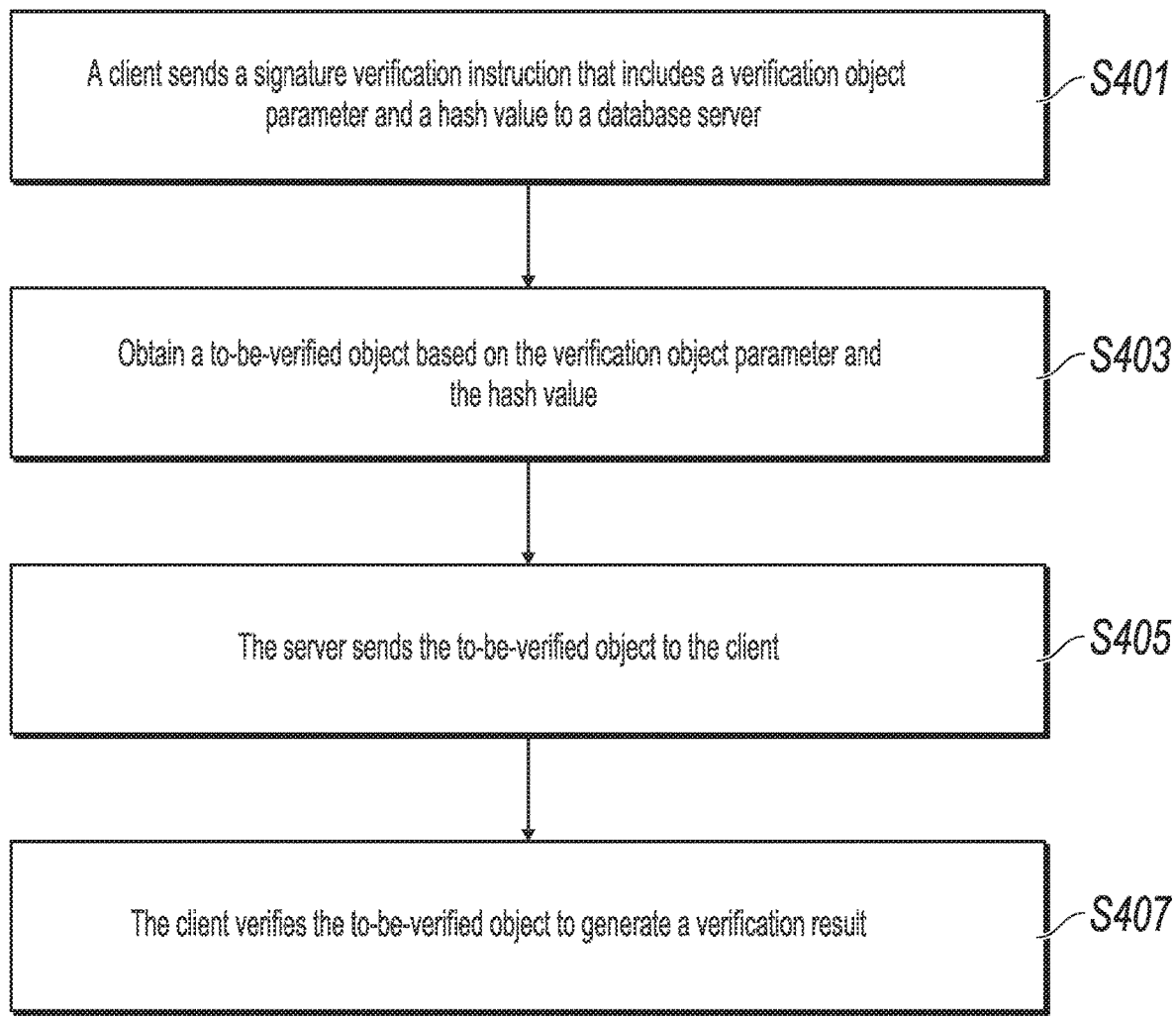
FIG. 4 is a schematic flowchart illustrating a signature verification method in a blockchain ledger, according to an implementation of the present specification.

Therefore, an implementation of the present specification provides a signature verification method in a blockchain ledger. The method is applied to a system including a database server and a client. The database server stores data by using the blockchain ledger in a centralized way. FIG. 4 is a schematic flowchart illustrating a signature verification method in a blockchain ledger, according to an implementation of the present specification. The method includes:

S401. The client sends a signature verification instruction that includes a verification object parameter and a hash value to the database server, where the verification object parameter includes a third-party parameter, a platform parameter, and a time service certificate parameter.

As shown in FIG. 1, an individual user or an organization user can initiate verification on a digital signature to the server by using a verification instruction. Because there can be multiple types of digital signatures, the verification object parameter is used to indicate a type of a current to-be-verified object to the server, so the server obtains a corresponding to-be-verified object.

The third-party parameter is used to indicate that the to-be-verified object is a third-party digital signature, the platform parameter is used to indicate that the to-be-verified object is a server digital signature, and the time service certificate parameter is used to indicate that the to-be-verified object is a time service certificate.

The following provides specific examples of several verification instructions:
1. VerifyProof(Role, hash1), where "Role" is the third-party parameter;
2. VerifyProof(ANT, hash2), where "ANT" is the platform parameter;
3. VerifyProof(CA, hash3), where "CA" is the time service certificate parameter.

Apparently, in practice, specific verification instruction forms and verification object parameter forms can be set based on actual needs, which does not constitute a limitation on the solution.

S403. The server obtains the to-be-verified object based on the verification object parameter and the hash value, where the type of the to-be-verified object includes a third-party digital signature, a server digital signature, or a time service certificate.

The server first determines, based on the hash value, a data record or a data block that the user needs to verify, and obtains, based on the data record or the data block, a corresponding to-be-verified object that includes a digital signature. Apparently, a type of the to-be-verified object is specified by the verification object parameter, which is specifically as follows:

1. When the verification object parameter is the third-party parameter, the third-party digital signature needs to be verified current time. When "Role" is used as the third-party parameter for verification, a specific a third party does not need to be specified in an operation instruction by the user. The server can determine the corresponding data record or data block based on the hash value, so as to determine a third party involved in the data record or data block. For example, in the data block corresponding to the hash value, all other users involved in writing data are determined as other parties.

Therefore, the server sends the data record or the data block DATA that corresponds to the hash value to a third party that was determined. After receiving the data record or the data block DATA, the third party performs a hash operation on the data record or the data block DATA to obtain a Digest (DATA), digitally signs the digest by using a private key of the third party to generate encrypted data DigestEncode (DATA) for the digest, and returns the encrypted data to the server.

2. When the verification object parameter is the platform parameter, the server digital signature needs to be verified current time. In this case, the server directly signs, by using a private key, the data record or the data block determined based on the hash value, to generate encrypted data DigestEncode (DATA).

3. When the verification object parameter is the time service certificate parameter, the type of the current to-be-verified object is the time service certificate. In this case, the server only needs to determine a block height of the data block corresponding to the hash value in the verification instruction (if the hash value corresponds to one data record, a block height of a data block in which the data record is located is determined), and then determine a time service certificate corresponding to the block height (a time service certificate corresponds to a continued part of ledger, that is, corresponds to a block height interval).

S405. The server sends the to-be-verified object to the client.

The server returns the obtained encrypted data DigestEncode (DATA) or the time service certificate to the client. Apparently, the digital signature of the object to be verified by the client is already included in the encrypted data DigestEncode (DATA). As mentioned earlier, the time service certificate already includes the private key signature of the trusted time service authority. Certainly, while returning the encrypted data DigestEncode (DATA), the server can also put the original DATA back to the client (generally, the client locally stores the original DATA).

S407. The client verifies the to-be-verified object to generate a verification result.

A specific verification method is as follows: The Digest (DATA) is obtained by decrypting the encrypted data DigestEncode (DATA) by using a public key that corresponds to the encrypted object (the public key of the third party or the server is disclosed to anyone and can be obtained at any time). At the same time, Digest (DATA) local is generated by using the local DATA or the DATA returned by the server. If Digest (DATA) is consistent with Digest (DATA) local, it indicates that the signature of the third party or the server is reliable.

Verification on the time service certificate is similar to that in the previous description: The time service certificate is decrypted by using the public key disclosed by the trusted time service authority, to obtain information included in the time service certificate: a starting data block height, an ending data block height, a trusted timestamp, and a root hash of the part of ledger. If the previous information can be obtained, it indicates that the time service certificate provided by the server is trustworthy.

It can be seen from the previous technical solution provided in this implementation of the present application that, a user specifies, by using a verification object parameter when initiating verification, a type that needs to be verified and provides a related hash value, so a server can determine, based on the hash value and the verification object parameter, a digital signature that the user wants to verify, to obtain a digital signature of data related to the hash value for the user to perform verification. This implementation enables the user to flexibly verify various digital signatures involved in the same ledger.

Correspondingly, an implementation of the present specification further provides a signature verification system in a blockchain ledger. The system includes a database server and a client. The database server stores data by using the blockchain ledger in a centralized way.

The client sends a signature verification instruction that includes a verification object parameter and a hash value to the database server, where the verification object parameter includes a third-party parameter, a platform parameter, and a time service certificate parameter, and where the verification object parameter is used to indicate a type of a to-be-verified object; the server obtains the to-be-verified object based on the verification object parameter and the hash value, where the type of the to-be-verified object includes a third-party digital signature, a server digital signature, or a time service certificate; the server sends the to-be-verified object to the client; and the client verifies the to-be-verified object to generate a verification result.

Further, in the system, when the verification object parameter is the third-party parameter, the server determines, based on the third-party parameter, that the type of the to-be-verified object is the third-party digital signature; the server determines a data record or a data block corresponding to the hash value, and sends the data record to a third party of the ledger, so the third party digitally signs the data record or the data block; and the server receives encrypted data returned by the third party, where the encrypted data is obtained by the third party by digitally signing the data record or the data block.

Further, in the system, when the verification object parameter is the platform parameter, the server determines, based on the platform parameter, that the to-be-verified object is the server digital signature; the server determines a data record or a data block corresponding to the hash value; and the server digitally signs the data record or the data block to generate encrypted data that includes the server digital signature.

Further, in the system, when the verification object parameter is the time service certificate parameter, the server determines, based on the time service certificate parameter, that the to-be-verified object is the time service certificate; the server determines a block height of a data block in which a data record corresponding to the hash value is located, or determines a block height of a data block corresponding to the hash value; and the server obtains a time service certificate corresponding to the data block, where the time service certificate corresponds to a continued part of ledger, where the time service certificate includes a starting data block height, an ending data block height, a trusted timestamp, and a root hash of the part of ledger, so as to determine a generation time of the part of ledger; and where the time service certificate includes a digital signature of a trusted time service authority.

Further, on the server, a data block is pre-generated by: receiving to-be-stored data records, and determining a hash value of each data record; and when a predetermined blocking condition is satisfied, determining each data record to be written into a data block to generate an Nth data block that includes a hash value of the data block and the data record, including: when $N=1$, determining a hash value and a block height of an initial data block based on a predetermined method; and when $N>1$, determining a hash value of the Nth data block based on each data record to be written into the data block and a hash value of an $(N-1)$th data block, to generate the Nth data block that includes the hash value of the Nth data block, each data record, and a blocking moment of the data block, where block heights of data blocks are increased monotonically based on a sequence of blocking moments.

Further, on the server in the system, the time service certificate is pre-generated by: determining, by the server, a target ledger on which time service authentication needs to be performed, where the target ledger includes at least one data block or multiple data blocks with consecutive block heights; generating a Merkle tree that corresponds to the target ledger based on a sequence of block heights of the data blocks in the target ledger, and determining a root hash of the Merkle tree based on block hashes of the data blocks; sending the root hash of the Merkle tree and data block-related information to a trusted time service authority, where the data block-related information includes a starting block height, an ending block height, or the number of data blocks; and receiving a time service certificate that is returned by the trusted time service authority, where the time service certificate corresponds to the target ledger and includes a trusted timestamp and a digital signature of the trusted time service authority.

Figure 5:
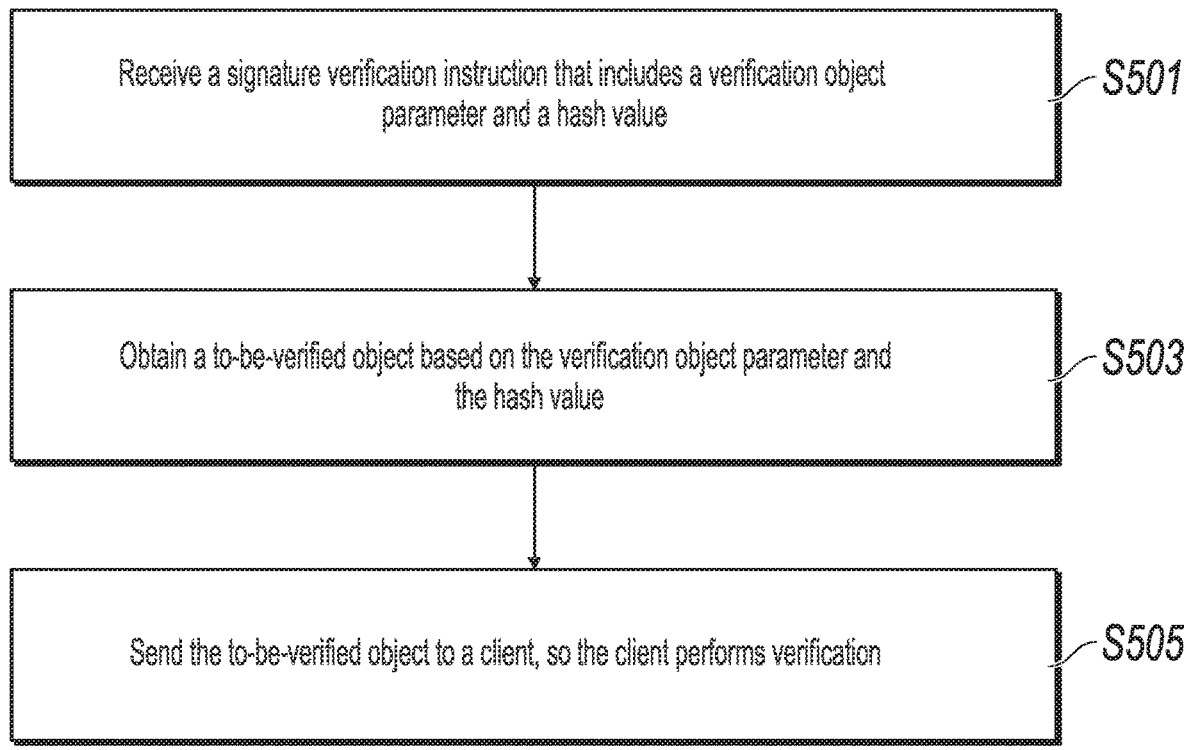
FIG. 5 is a schematic flowchart illustrating a signature verification method in a blockchain ledger on a server, according to an implementation of the present specification.

Correspondingly, an implementation of the present specification further provides a signature verification method in a blockchain ledger. The method is applied to a database server that stores data by using the blockchain ledger in a centralized way. FIG. 5 is a schematic flowchart illustrating a signature verification method in a blockchain ledger on a server, according to an implementation of the present specification. The method includes:

S501. Receive a signature verification instruction that includes a verification object parameter and a hash value, where the verification object parameter includes a third-party parameter, a platform parameter, and a time service certificate parameter, and where the verification object parameter is used to indicate a type of a to-be-verified object.

S503. Obtain the to-be-verified object based on the verification object parameter and the hash value, where the type of the to-be-verified object includes a third-party digital signature, a server digital signature, or a time service certificate.

S505. Send the to-be-verified object to a client, so the client performs verification.

Figure 6:
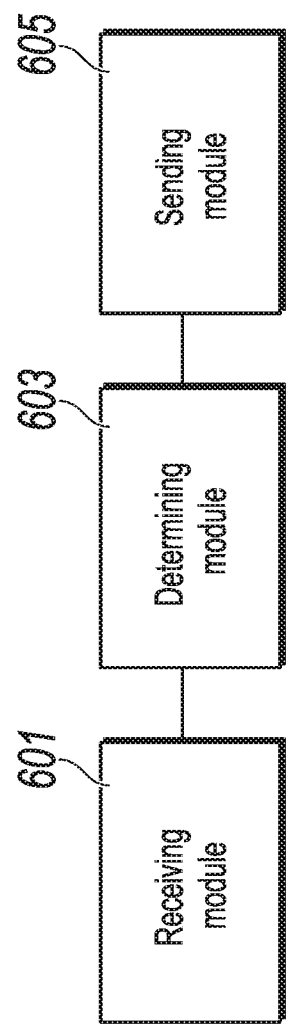
FIG. 6 is a schematic structural diagram illustrating a signature verification apparatus in a blockchain ledger, according to an implementation of the present specification.

Further, an implementation of the present specification further provides a signature verification apparatus in a blockchain ledger. The apparatus is applied to a database server that stores data by using the blockchain ledger in a centralized way. FIG. 6 is a schematic structural diagram illustrating a signature verification apparatus in a blockchain ledger, according to an implementation of the present specification. The apparatus includes: a receiving module 601, configured to receive a signature verification instruction that includes a verification object parameter and a hash value, where the verification object parameter includes a third-party parameter, a platform parameter, and a time service certificate parameter, and where the verification object parameter is used to indicate a type of a to-be-verified object; a determining module 603, configured to obtain the to-be-verified object based on the verification object parameter and the hash value, where the type of the to-be-verified object includes a third-party digital signature, a server digital signature, or a time service certificate; and a sending module 605, configured to send the to-be-verified object to a client, so the client performs verification.

An implementation of the present specification further provides a computer device. The computer device includes at least a memory, a processor, and a computer program that is stored in the memory and that can run on the processor. When executing the program, the processor implements the signature verification method in a blockchain ledger shown in FIG. 5.

Figure 7:
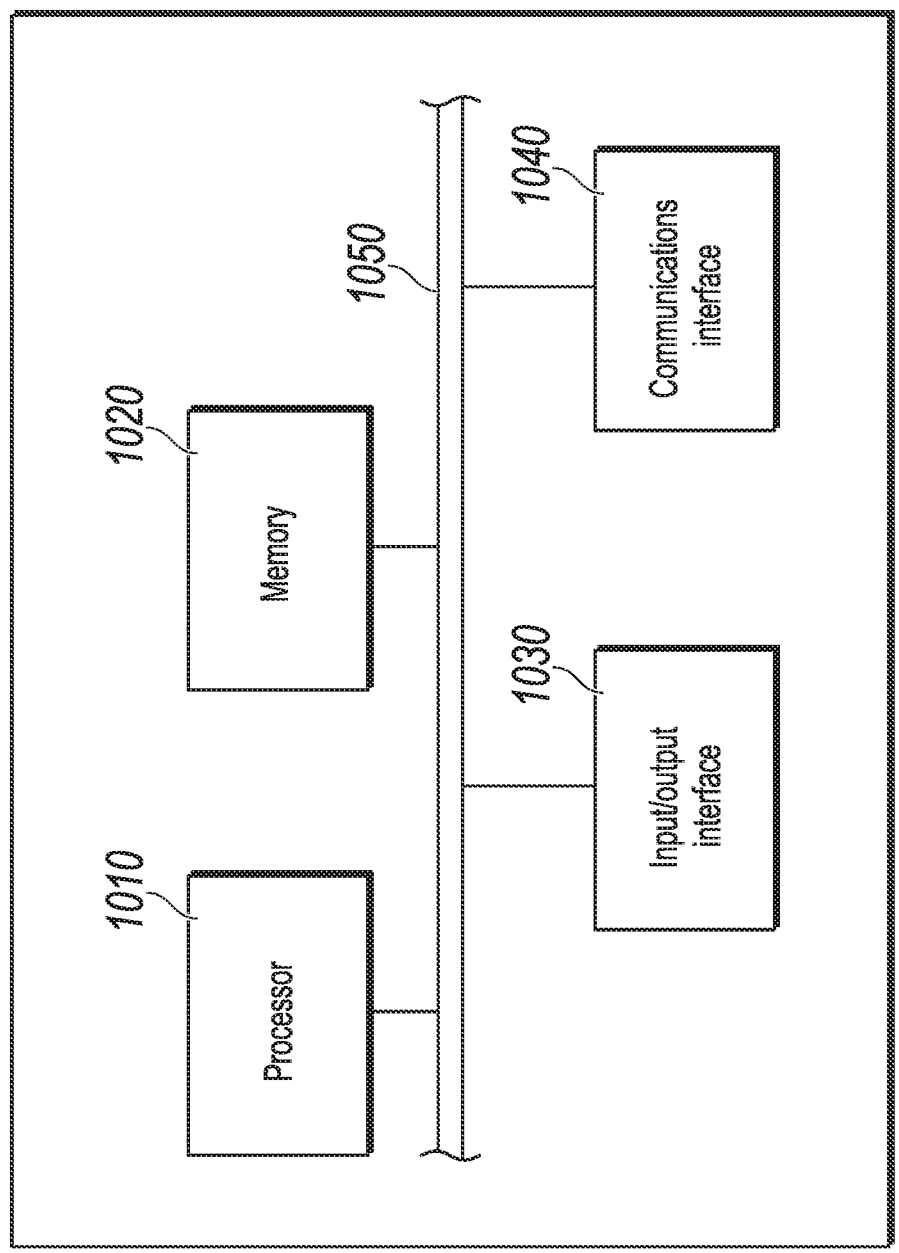
FIG. 7 is a schematic structural diagram illustrating a device used to configure a method in an implementation of the present specification.

FIG. 7 is a more detailed schematic diagram illustrating a hardware structure of a computing device, according to an implementation of the present specification. The device can include a processor 1010, a memory 1020, an input/output interface 1030, a communications interface 1040, and a bus 1050. The processor 1010, the memory 1020, the input/output interface 1030, and the communications interface 1040 are communicatively connected to each other inside the device by using the bus 1050.

The processor 1010 can be implemented by using a general central processing unit (CPU), a microprocessor, an application-specific integrated circuit (ASIC), one or more integrated circuits, etc., and is configured to execute a related program, so as to implement the technical solutions provided in the implementations of the present specification.

The memory 1020 can be implemented by using a read-only memory (ROM), a random access memory (RAM), a static storage device, a dynamic storage device, etc. The memory 1020 can store an operating system and another application program. When the technical solutions provided in the implementations of the present specification are implemented by using software or firmware, related program code is stored in the memory 1020, and is invoked and executed by the processor 1010.

The input/output interface 1030 is configured to be connected to an input/output module, to input or output information. The input/output module (not shown in the figure) can be used as a component and configured in the device, or can be externally connected to the device, to provide a corresponding function. The input module can include a keyboard, a mouse device, a touchscreen, a microphone, various sensors, etc. The output module can include a monitor, a speaker, a vibrator, an indicator, etc.

The communications interface 1040 is configured to be connected to a communications module (not shown in the figure), to implement a communication interaction between the device and another device. The communications module can perform communication in a wired way (for example, USB or a network cable), or can perform communication in a wireless way (for example, a mobile network, Wi-Fi, or Bluetooth).

The bus 1050 includes one channel, used to transmit information between components (for example, the processor 1010, the memory 1020, the input/output interface 1030, and the communications interface 1040) of the device.

It is worthwhile to note that although only the processor 1010, the memory 1020, the input/output interface 1030, the communications interface 1040, and the bus 1050 of the device are shown, during specific implementation, the device can further include other components needed for implementing normal running. In addition, a person skilled in the art can understand that the device can include only components necessary for implementing the solutions in the implementations of the present specification, but does not necessarily include all components shown in the figure.

An implementation of the present specification further provides a computer readable storage medium on which a computer program is stored. When being executed by a processor, the program implements the signature verification method in a blockchain ledger shown in FIG. 5.

The computer readable medium includes persistent, non-persistent, movable, and unmovable media that can store information by using any method or technology. The information can be a computer readable instruction, a data structure, a program module, or other data. Examples of the computer storage medium include but are not limited to a phase change random access memory (PRAM), a static RAM (SRAM), a dynamic RAM (DRAM), a RAM of another type, a read-only memory (ROM), an electrically erasable programmable ROM (EEPROM), a flash memory or another memory technology, a compact disc ROM (CD-ROM), a digital versatile disc (DVD), or another optical storage, a cassette, a cassette magnetic disk storage, or another magnetic storage device or any other non-transmission medium. The computer storage medium can be configured to store information that can be accessed by a computing device. As described in the present application, the computer readable medium does not include computer readable transitory media such as a modulated data signal and a carrier.

It can be seen from the previous descriptions of the implementations that, a person skilled in the art can clearly understand that the implementations of the present specification can be implemented by using software and a necessary general hardware platform. Based on such an understanding, the technical solutions in the implementations of the present specification essentially or the part contributing to the existing technology can be implemented in a form of a software product. The computer software product can be stored in a storage medium, such as a ROM/RAM, a magnetic disk, or an optical disc, and includes several instructions for instructing a computer device (which can be a personal computer, a server, a network device, etc.) to perform the method described in the implementations of the present specification or in some parts of the implementations of the present specification.

The system, method, module, or unit illustrated in the previous implementations can be implemented by using a computer chip or an entity, or can be implemented by using a product having a certain function. A typical implementation device is a computer, and the computer can be a personal computer, a laptop computer, a cellular phone, a camera phone, a smartphone, a personal digital assistant, a media player, a navigation device, an email receiving and sending device, a game console, a tablet computer, a wearable device, or any combination of these devices.

The implementations in the present specification are described in a progressive way. For same or similar parts of the implementations, references can be made to the implementations mutually. Each implementation focuses on a difference from other implementations. Particularly, a device implementation is similar to a method implementation, and therefore is described briefly. For a related part, references can be made to some descriptions in the method implementation. The previously described apparatus implementations are merely examples. The modules described as separate parts can or cannot be physically separate. During implementation of the solutions in the implementations of the present application, functions of the modules can be implemented in one or more pieces of software and/or hardware. Some or all of the modules can be selected based on an actual need to implement the solutions of the implementations. A person of ordinary skill in the art can understand and implement the implementations of the present specification without creative efforts.

The previous descriptions are merely specific implementations of the implementations of the present application. It is worthwhile to note that a person of ordinary skill in the art can further make several improvements or polishing without departing from the principle of the implementations of the present application, and the improvements or polishing shall fall within the protection scope of the implementations of the present application.

What is claimed is:

1. A computer-implemented method comprising:
   receiving, by a server and from a client, a signature verification instruction that comprises a time service certificate parameter and a hash value, wherein the server is configured to store data by using a blockchain ledger;
   obtaining, by the server, a time service certificate based on the time service certificate parameter and the hash value, wherein the time service certificate is obtained by the server when a time service condition is satisfied, wherein obtaining the time service certificate comprises:
      determining, by the server, a block height of a data block of the blockchain ledger in which a data record corresponding to the hash value is located, or determining a block height of the data block of the blockchain ledger corresponding to the hash value; and
      obtaining the time service certificate corresponding to the data block, wherein the time service certificate corresponds to a part of the blockchain ledger, wherein the time service certificate comprises a starting data block height, an ending data block height, a trusted timestamp, and a root hash of the part of the blockchain ledger, so as to determine a generation time of the part of the blockchain ledger, and wherein the time service certificate comprises a digital signature of a trusted time service authority; and
   sending, by the server and to the client, the time service certificate.

2. The method according to claim 1, wherein the time service condition includes a number of data blocks on which time service authentication is to be performed reaching a quantity threshold.

3. The method according to claim 1, wherein the time service condition includes a time interval from a previous time service authentication reaching a time threshold.

4. The method according to claim 1, wherein on the server, a data block is pre-generated by:
   receiving to-be-stored data records;
   determining a hash value of each data record; and
   in response to a predetermined blocking condition being satisfied, determining each data record to be written into the data block to generate an Nth data block that comprises a hash value of the data block and the data record.

5. The method according to claim 4, further comprising:
   when N=1, determining an initial hash value and an initial block height of an initial data block based on a predetermined method.

6. The method according to claim 4, further comprising:
   when N>1, determining a hash value of the Nth data block based on each data record to be written into the data block and a hash value of an (N−1)th data block, to generate the Nth data block that comprises the hash value of the Nth data block, each data record, and a blocking moment of the data block, wherein block heights of data blocks are increased monotonically based on a sequence of blocking moments.

7. The method according to claim 4, wherein on the server, the time service certificate is pre-generated by:
   determining, by the server, a target ledger on which time service authentication is to be performed, wherein the target ledger comprises at least one data block or multiple data blocks with consecutive block heights;
   generating a Merkle tree that corresponds to the target ledger based on a sequence of block heights of data blocks in the target ledger, and determining a root hash of the Merkle tree based on block hashes of the data blocks;
   sending the root hash of the Merkle tree and data block-related information to the trusted time service authority, wherein the data block-related information comprises a starting block height, an ending block height, or a number of data blocks; and
   receiving the time service certificate that is returned by the trusted time service authority, wherein the time service certificate corresponds to the target ledger and comprises the trusted timestamp and the digital signature of the trusted time service authority.

8. A computer-implemented system, comprising:
   one or more computers; and
   one or more computer memory devices interoperably coupled with the one or more computers and having tangible, non-transitory, machine-readable media storing one or more instructions that, when executed by the one or more computers, perform operations comprising:
      receiving, by a server and from a client, a signature verification instruction that comprises a time service certificate parameter and a hash value, wherein the server is configured to store data by using a blockchain ledger;
      obtaining, by the server, a time service certificate based on the time service certificate parameter and the hash value, wherein the time service certificate is obtained by the server when a time service condition is satisfied, wherein obtaining the time service certificate comprises:
         determining, by the server, a block height of a data block of the blockchain ledger in which a data record corresponding to the hash value is located, or determining a block height of the data block of the blockchain ledger corresponding to the hash value; and
         obtaining the time service certificate corresponding to the data block, wherein the time service certificate corresponds to a part of the blockchain ledger, wherein the time service certificate comprises a starting data block height, an ending data block height, a trusted timestamp, and a root hash of the part of the blockchain ledger, so as to determine a generation time of the part of the blockchain ledger, and wherein the time service certificate comprises a digital signature of a trusted time service authority; and sending, by the server and to the client, the time service certificate.

9. The system according to claim 8, wherein the time service condition includes a number of data blocks on which time service authentication is to be performed reaching a quantity threshold.

10. The system according to claim 8, wherein the time service condition includes a time interval from a previous time service authentication reaching a time threshold.

11. The system according to claim 8, wherein on the server, a data block is pre-generated by:

receiving to-be-stored data records;

determining a hash value of each data record; and in response to a predetermined blocking condition being satisfied, determining each data record to be written into the data block to generate an Nth data block that comprises a hash value of the data block and the data record.

12. The system according to claim 11, the operations further comprising:

when N=1, determining an initial hash value and an initial block height of an initial data block based on a predetermined method.

13. The system according to claim 11, the operations further comprising:

when N>1, determining a hash value of the Nth data block based on each data record to be written into the data block and a hash value of an (N−1)th data block, to generate the Nth data block that comprises the hash value of the Nth data block, each data record, and a blocking moment of the data block, wherein block heights of data blocks are increased monotonically based on a sequence of blocking moments.

14. The system according to claim 11, wherein on the server, the time service certificate is pre-generated by:

determining, by the server, a target ledger on which time service authentication is to be performed, wherein the target ledger comprises at least one data block or multiple data blocks with consecutive block heights;

generating a Merkle tree that corresponds to the target ledger based on a sequence of block heights of data blocks in the target ledger, and determining a root hash of the Merkle tree based on block hashes of the data blocks;

sending the root hash of the Merkle tree and data block-related information to the trusted time service authority, wherein the data block-related information comprises a starting block height, an ending block height, or a number of data blocks; and receiving the time service certificate that is returned by the trusted time service authority, wherein the time service certificate corresponds to the target ledger and comprises the trusted timestamp and the digital signature of the trusted time service authority.

15. A non-transitory, computer-readable medium storing one or more instructions executable by a computer system to perform operations comprising:

receiving, by a server and from a client, a signature verification instruction that comprises a time service certificate parameter and a hash value, wherein the server is configured to store data by using a blockchain ledger;

obtaining, by the server, a time service certificate based on the time service certificate parameter and the hash value, wherein the time service certificate is obtained by the server when a time service condition is satisfied, wherein obtaining the time service certificate comprises:

determining, by the server, a block height of a data block of the blockchain ledger in which a data record corresponding to the hash value is located, or determining a block height of the data block of the blockchain ledger corresponding to the hash value; and obtaining the time service certificate corresponding to the data block, wherein the time service certificate corresponds to a part of the blockchain ledger, wherein the time service certificate comprises a starting data block height, an ending data block height, a trusted timestamp, and a root hash of the part of the blockchain ledger, so as to determine a generation time of the part of the blockchain ledger, and wherein the time service certificate comprises a digital signature of a trusted time service authority; and sending, by the server and to the client, the time service certificate.

16. The computer-readable medium of claim 15, wherein the time service condition includes a number of data blocks on which time service authentication is to be performed reaching a quantity threshold.

17. The computer-readable medium of claim 15, wherein the time service condition includes a time interval from a previous time service authentication reaching a time threshold.

* * * * *